F. T. SULLIVAN.
KNOCKDOWN STRUCTURE.
APPLICATION FILED JAN. 30, 1909.

947,655.

Patented Jan. 25, 1910.
4 SHEETS—SHEET 1.

Witnesses
H. A. Robinette
E. L. Mann

Inventor
Frank T. Sullivan
By
Attorney

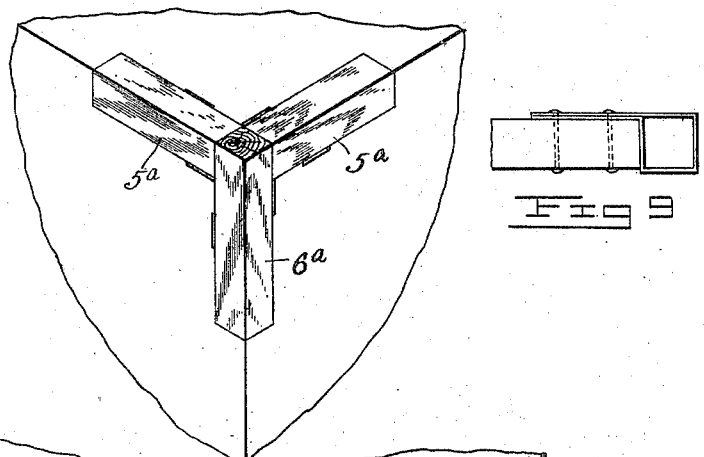
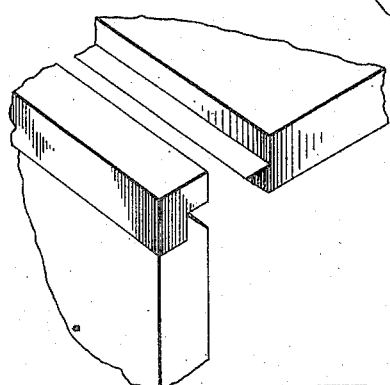
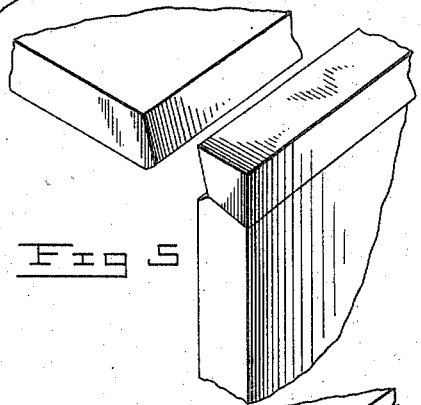
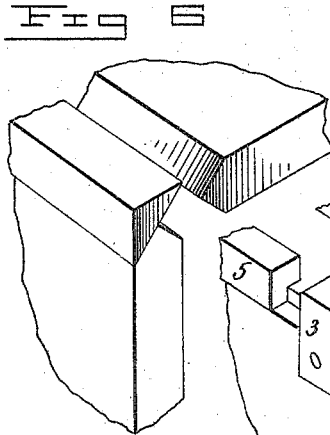
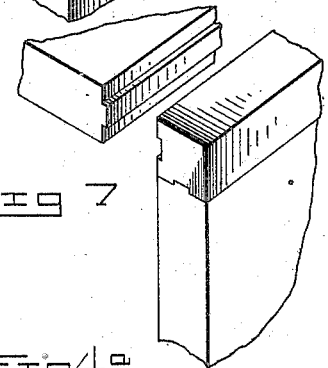
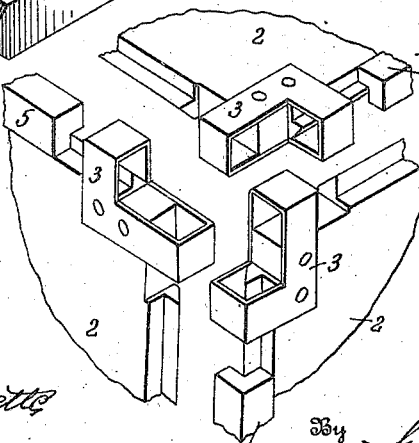

F. T. SULLIVAN.
KNOCKDOWN STRUCTURE.
APPLICATION FILED JAN. 30, 1909.

947,655.

Patented Jan. 25, 1910.
4 SHEETS—SHEET 3.

Inventor
Frank T. Sullivan

Witnesses

By
Attorney

F. T. SULLIVAN.
KNOCKDOWN STRUCTURE.
APPLICATION FILED JAN. 30, 1909.

947,655.

Patented Jan. 25, 1910.
4 SHEETS—SHEET 4.

Witnesses
H. C. Rohrette
E. H. Bickerton

Inventor
Frank T. Sullivan

By
Attorney

UNITED STATES PATENT OFFICE.

FRANK T. SULLIVAN, OF BROOKLYN, NEW YORK.

KNOCKDOWN STRUCTURE.

947,655.   Specification of Letters Patent.   Patented Jan. 25, 1910.

Application filed January 30, 1909. Serial No. 475,236.

*To all whom it may concern:*

Be it known that I, FRANK T. SULLIVAN, a citizen of the United States, residing at Brooklyn, in the county of Kings and State of New York, have invented new and useful Improvements in Knockdown Structures, of which the following is a specification.

The present invention relates to improvements in locking or securing devices for built up structures, such as boxes and the like, although the locking and securing means which I have invented, and which will be set forth hereinafter, are adaptable to various structures other than the box structures in connection with which it is more particularly displayed in this disclosure, and I do not therefore limit myself to the particular adaptation herein set forth.

One object of the invention is to provide a structure (particularly box structures) in which the elements of which it is composed may be cheaply constructed and readily assembled and disassembled, so that a knockdown construction is secured which will admit of convenient shipping of the box in the first instance, and its subsequent setting up and continued use in set up and knockdown conditions; and all without the necessity of nailing or securing the parts together in the manner usually adopted in box making.

Another object of the invention is to provide a corner buffer for the box, which will efficiently protect the box structure against abrasion and breakage in handling, this corner buffer being especially desirable where fiber board is used in making up the walls of the box.

A still further object of the invention is to provide a structure in which the walls may be made of single sheets of fiber board, and the disadvantages of making up the walls of one or more pieces of board and tongue and grooving such pieces together to make a tight wall are avoided.

Figure 1:
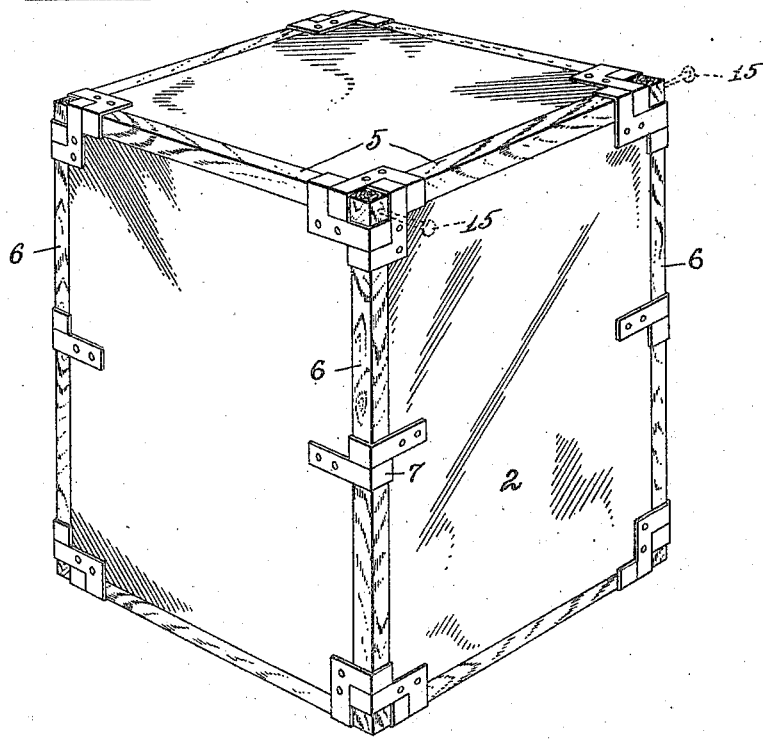
Figure 2:
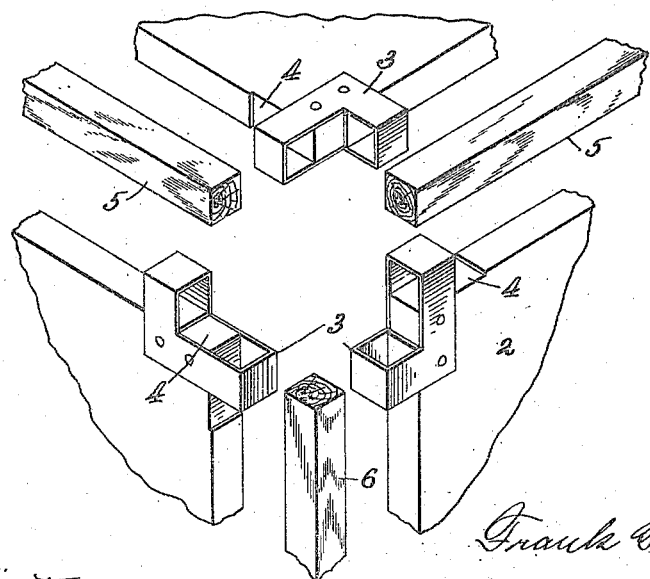
Figure 10:
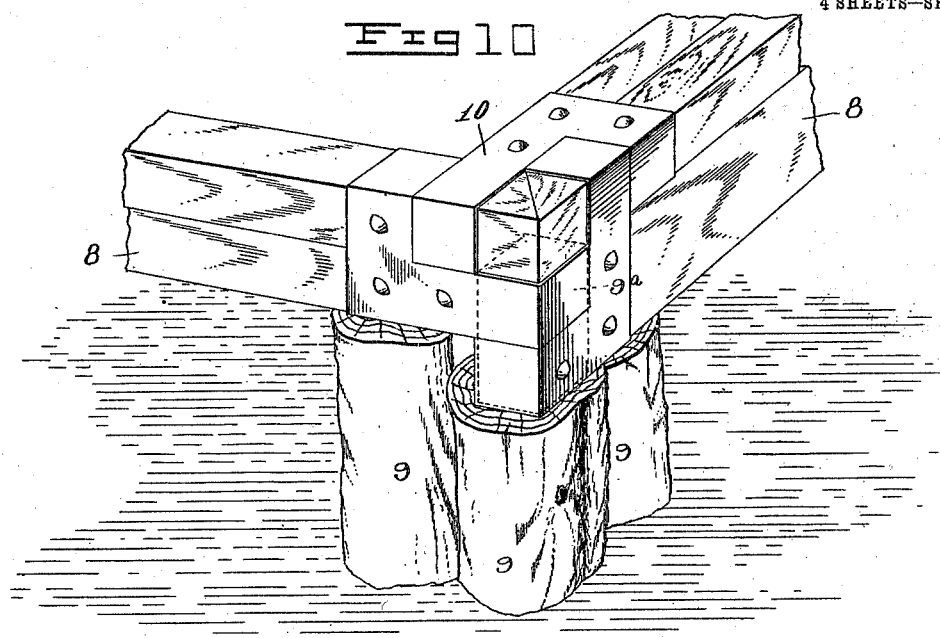
Figure 11:
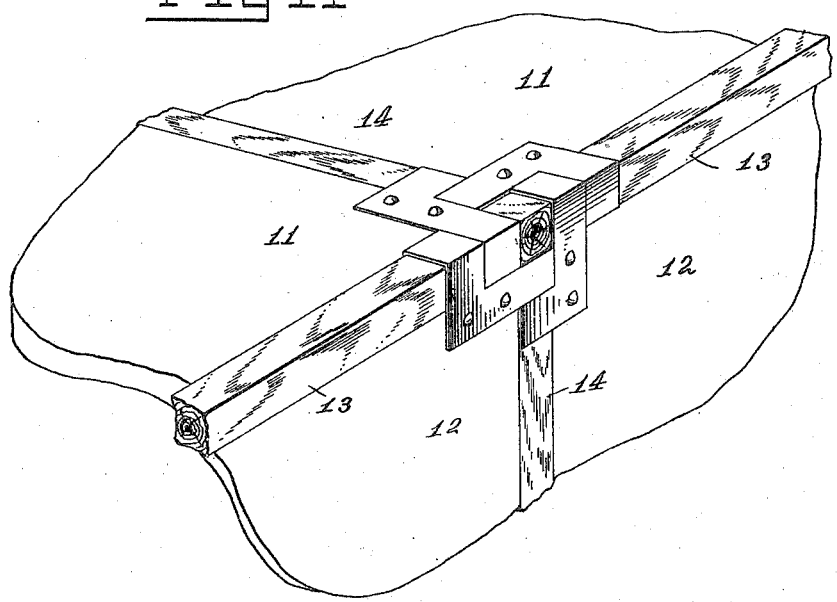
Figure 12:
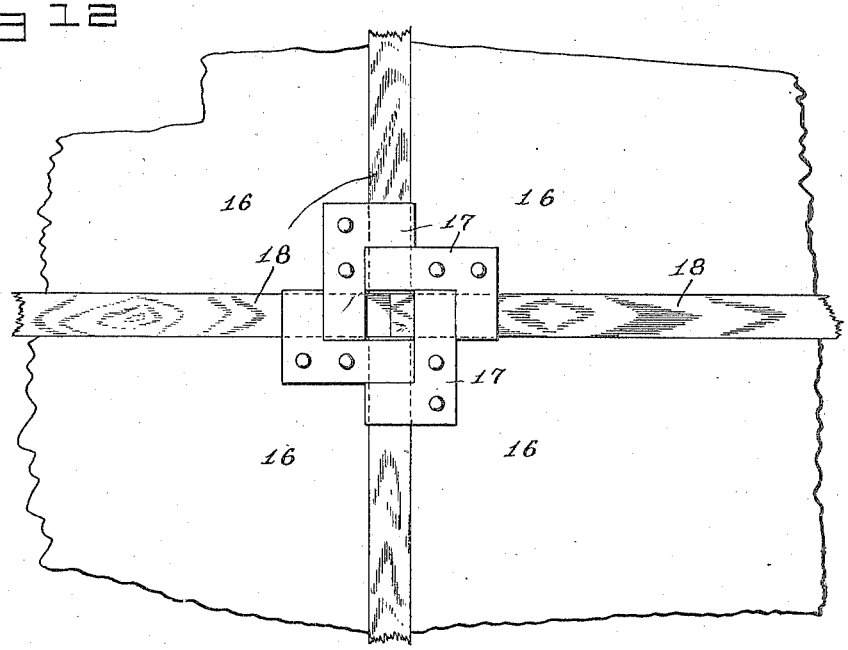
Figure 13:
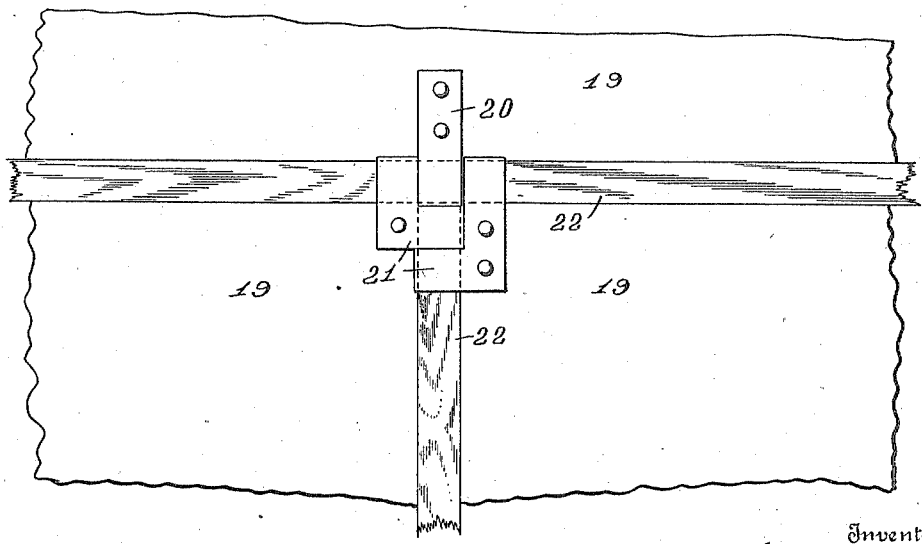

In order that the invention may be clear to those skilled in the art I have illustrated in the accompanying drawings one form of my invention and in said drawings: Figure 1 is a perspective view of a box built up with my securing and locking means. Fig. 2 is a perspective view showing the parts illustrated in Fig. 1 in disassembled position. Fig. 3 is a perspective view illustrating the use of short locking elements as distinguished from the long locking pins, shown in Figs. 1 and 2. Figs. 4, 5, 6 and 7 are perspective views of different forms of locking pins which may be used. Fig. 4$^a$ is a perspective view showing the modified type of connection illustrated in Fig. 4 disassembled. Fig. 8 is a detail view of one of the pin loops shown in the preceding views. Fig. 9 is a side elevation of a slightly different form of pin loop. Fig. 10 illustrates the adaptation of my invention to a structure other than a box illustrated in the other views. Fig. 11 is still another illustration of a further adaptation of my invention. Fig. 12 is a view showing a construction similar to that shown in Fig. 10 applied to a wall or siding. Fig. 13 is a view showing a wall or siding where three wall members or boards are locked together.

Referring now particularly to Figs. 1 and 2 of the drawings, 2 denotes the walls of a box structure, which walls may be of any suitable material as, for example, fiber board, which is now being largely used owing to the cost of lumber in the making of boxes, packing cases and the like.

The box walls 2 are provided at each corner with substantially L-shaped clips 3, the loops of which extend outwardly beyond the edges of the walls 2. The said clips 3 are so positioned at the wall corners that when the parts are assembled the said loops will be nested, as shown in Fig. 1 and as will be apparent from the disassembled parts shown in Fig. 2, so that the open projecting loops on these clips 3 will be in register with one another, and in order that the registering of these loops may be accurate, I preferably cut away the material of the walls 2 at the points 4, see Fig. 2, to form seats for the loops of the adjacent wall members.

When the walls are assembled, with their clips 3 in nested relation, the locking pins 5, which, in the form shown in Figs. 1 and 2, are rectangular in cross-section, may be slipped into place with the ends engaging the nested loops of the clips 3, so as to lock the wall portions 2 together, and it will be observed that these locking pins 5 fit into and fill out the angle of the abutting walls of the box. The locking pins 5 may, of course, be of any suitable material, those in the present case being shown as made of wood. By reference to Fig. 1, it will be seen that the vertically arranged locking pins 6 are relatively longer than the pins 5 so that their ends will project into and fill out the corners formed by the assembled and nested loops so as to maintain the pins 5 in proper position, holding them against endwise movement, so that, after the structure is assembled, it is necessary only to secure the pin members 6 in position in any suitable manner to hold the entire structure in assembled position, and under ordinary circumstances frictional engagement of the parts 6 will be sufficient to prevent their shifting or loosening to the extent that the other parts will be released.

The several locking pins 5 and 6 may, if their length is such as to necessitate it, pass through clips 7 placed about midway their length and secured by rivets or in any suitable manner, as shown in Fig. 8, to the wall portions 2.

Instead of providing the locking pins, as shown in Figs. 1 and 2 extending the full length of the box, they may be made, as shown in Fig. 3, in short sections, which sections will be seated in cut-away seats at the corners of the box, as shown, the arrangement of clips 3 being, of course, the same as shown in Figs. 1 and 2, and these short sections 5ª and 6ª will be entered in the loops of the corner clips and seated in the same manner as described in connection with Figs. 1 and 2.

Fig. 4 shows a different form of pin, these pins being channeled on their inner faces so as to receive the rabbeted edges of the wall portions and form a tight joint, and one in which all danger of the walls bulging away and opening at the meeting edges is eliminated.

In Figs. 5 and 6 are shown locking pins of different form in cross-section, it being understood that in the form shown in Figs. 5 and 6, the loops of the pin engaging clips may be made, if desired, to conform to the cross-section of the locking pins, although the same clip shown in Figs. 1 and 2 may be used.

In Fig. 7 still another form of locking pin is shown, this form showing a tongue-and-groove connection between the walls and the locking pins.

In Fig. 9 is shown a laminated form of clip in which the attaching limbs of the clip instead of straddling the board or partition to which they are secured are brought together on one side and secured by rivets in the manner shown, and this form of clip is of value in some instances in that it reinforces the structure against unusual strain from the interior, although the type of clip heretofore described and shown in the other views is preferable for general work.

In Fig. 10 I have shown this locking device adapted to pier heads, in which the timbers 8 are supported on the usual piles 9, and their corners are interlocked by means of clips 10 in the same manner as the box is built up, it being obvious that the clips 10 would be of such material and dimensions as to give the necessary strength to support this heavy work; and in this construction the end pile will preferably have an integral shaped projection 9ª which engages the nested clips and locks the parts.

In Fig. 11 I have shown the adaptation of my invention to a wall or floor construction, the floor sections 11 and the wall sections 12 each being provided with clips of the same form as that described, which are nested together in such manner that the corner locking pins 13 will hold the sections 11 and 12 in their relative positions, while the other locking pins 14 which are run parallel with the floor sections and wall sections 11 and 12, respectively, will secure the floor sections and the wall sections in alinement and parallel with each other.

In Fig. 12 the wall members 16, 16, lie in the same plane, and are locked together by means of the nested clips 17, 17, and the locking pins 18 which lie between the edges of the wall member 16 in an obvious manner and interlock at their ends with the nested clips, thus forming a rigid but easily assembled and disassembled wall or siding, and this construction is one very adaptable to portable house structures and the like.

In Fig. 13 a wall or partition is shown in which three panels 19 are secured together, the upper panel which laps the joint between the two lower panels having a U-shaped clip 20 which lies between the L-shaped clips 21 secured at the corners of the lower panels 19, the locking pins 22 engaging the nested clips 20 and 21 in a manner similar to that already described.

It will be seen that with slight variation from the generic principle embodied in the several constructions shown the invention may be adapted to very different arrangements of wall members and box members which are to be secured together and secure joints formed between the independent units of which the structure is built up.

As shown in Fig. 1, the locking pins 5 may be secured by means of a nail 15, which will serve to lock or secure the pin 5 in place, if it be found necessary to add to the frictional resistance against withdrawal of the locking pins from the clips.

While I have illustrated the locking pins in these various views as being angular in cross section various cross sectional contours being shown, it will be understood that they may be round if desired and the clip loops may be semicircular in form to conform to the cross sectional shape of the pins, and with such cross sectional shape it will be obvious that the walls can be arranged at an angle to one another.

The advantages of the construction hereinbefore described, is that the manner of securing the parts together provides a knockdown structure which may be readily made up, shipped flat, and set up for use, and the main part of the structure, if it be a box or partition, may be made of fiber board, compound lumber and the like, so that a comparatively small amount of lumber is necessary.

It will be observed that the strain at the joints of the structure is opposed by the tensile strength of the clips and that the strain upon the pins is cross-grained or shearing, thereby giving a maximum resistance at the joints. Furthermore the design of the clips and the pins is such as to fill out the corners of the wall members so as to give a flush rectangular form to the whole and by interlocking the pins and the wall members all bulging or opening at the seams of the structure is avoided.

The corner clips are so nested at the corners of the walls of the structure when a box is made, and the locking pins are so assembled with respect to the nested corner clips that the strain and shock of corner blows resulting from loading and unloading the boxes is practically taken up by the nested clips, and the shock and abrasion incident to heavy jolts on the corners of the box do not affect the walls and the locking pins as injuriously as would otherwise be the case. This is particularly valuable where the walls are made of fiber board, for unless this corner protection were provided the fiber board would rapidly deteriorate at the edges and corners, and the box would not stand up satisfactorily in use.

It will be observed that by utilizing the one-piece wall members or sections that after protracted handling and wearing of the wall members they may be cut down, the clips secured in place, and a smaller box or structure may be made.

It is obvious that I may adopt mechanical expedients and equivalents other than those shown and described herein, and I do not, therefore, limit myself to the details of construction herein set forth except in so far as I am limited by the prior art to which the invention belongs.

I claim:

1. In a structure of the class described the combination with wall members, of clips fastened to the corners of each wall and having outstanding pin receiving loops grouped in pairs at said corners, and straight corner pins fitted snugly in pairs of loops to bind said wall members together.

2. In a structure of the class described the combination with wall members, of right angled clips fastened to the corners of each wall and having pin receiving loops extending over adjacent edges of said wall into alinement with loops projecting from other walls, and straight corner pins fitted snugly in pairs of loops to firmly bind said wall members together.

3. In a structure of the class described the combination with wall members, of substantially L-shaped nesting corner clips, each clip having a pin receiving loop on its end, said loops extending beyond the adjacent edges of the wall member to which it is attached, and loop engaging corner pins adapted to fit snugly in said loops when the wall members are assembled and bind the same together.

4. In a structure of the class described, the combination with wall members having loop-receiving seats adjacent their corners, of nesting corner clips having pin-receiving loops resting in said seats, and loop-engaging pins binding said wall members together.

5. In a structure of the class described, the combination with wall members, of nesting corner clips having pin-receiving loops, and loop engaging pins to bind said wall members together, said pins engaging the edges of said wall members along their length to prevent bulging of the wall members between the corners.

6. The combination in a structure of the class described, of wall members, pin-receiving clips on said members, locking pins engaging said clips, and interlocking means between said pins and said wall members.

7. The combination in a structure of the class described, of wall members, pin-receiving clips on said members, locking pins engaging said clips, and undercut locking joints between said pin faces and the edges of said wall members.

8. The combination in a structure of the class described, of wall members, pin-receiving clips on said members, locking pins engaging said clips, said pins being undercut to receive the edges of said wall members.

9. The combination in a structure of the class described, of wall members formed of fiber board, corner clips secured to the corners of said wall members and adapted to be nested together when said wall members are in assembled position, and locking pins adapted to engage said nested clips, said locking pins extending lengthwise of the edges of the wall members whereby the corners and edges of the wall members are protected from abrasion.

In testimony whereof, I have hereunto set my hand in presence of two subscribing witnesses.

FRANK T. SULLIVAN.

Witnesses:
W. E. RANSOM,
WM. N. PACKER.